United States Patent [19]

Clark

[11] Patent Number: 5,731,595

[45] Date of Patent: Mar. 24, 1998

[54] DIAGNOSTIC INPUT FOR PROGRAMMABLE LOGIC CONTROLLER

[75] Inventor: Karen R. Clark, Elizabethton, Tenn.

[73] Assignee: Siemens Energy & Automation, Inc., Alpharetta, Ga.

[21] Appl. No.: 723,071

[22] Filed: Sep. 30, 1996

[51] Int. Cl.⁶ .................................................. H01J 40/14
[52] U.S. Cl. .......................... 250/551; 250/214 R; 327/514
[58] Field of Search ........................ 250/551, 214 R; 327/77, 78, 482, 489, 514

[56] References Cited

U.S. PATENT DOCUMENTS 4,275,307  6/1981  Struger et al. ........................ 327/514
4,558,226 12/1985  Takada et al. ........................ 250/551

*Primary Examiner*—Edward P. Westin
*Assistant Examiner*—Kevin Pyo

[57] ABSTRACT

An input device for a Programmable Logic Controller is taught. Briefly stated, an incoming input voltage is rectified with an input impedance being principally capacitive in order to avoid heat dissipation. This rectified power in turn cooperates with a current source such that once a set point is reached the current source current does not increase with increasing input voltage. The current source is also utilized prevent off-state leakage current from turning on an input optocoupler by allowing most of the input current to be drawn through the current source until a turn-on threshold which is set by a zener diode is met.

12 Claims, 1 Drawing Sheet

DIAGNOSTIC INPUT FOR PROGRAMMABLE LOGIC CONTROLLER

FIELD OF THE INVENTION

This invention relates, generally, to Programable Logic Controllers and more particularly to an electrically isolated diagnostic input therefor.

BACKGROUND OF THE INVENTION

Programmable Logic Controllers (PLC's) are being used more and more frequently as their cost and size decrease. This increased usage is also due to increased functionality while at the same time a dramatic increase in the number and types of operating systems which a PLC may cooperate with as well as software tools which greatly facilitate the writing of appropriate instruction sets.

Accordingly, PLC's once installed are likely to be modified or adapted on the fly with, for example, new operating instructions, additional input/output (I/O) instructions and signals, particularly instrumentation. As a result of this PLC's are being used in many more applications which are frequently critical or where a malfunction may cascade upstream or downstream to associated equipment.

Therefore, it is quite common and necessary to have I/O lines isolated from the PLC or the device to which the PLC is connected so that, in the event of failures due to power surges, etc., damage to associated devices is either prevented or at least isolated to as few items as possible.

A number of standards have been promulgated which define the extent or degree of isolation. One such standard is IEC1131 which defines the operating characteristics of various types of inputs to automation systems such as a PLC.

However, while the standards define the parameters of the input, they do not specify how this is accomplished. Accordingly, there have been a large number of schemes which satisfy the standard. Unfortunately, additional devices necessarily translate to additional cost, additional components, additional power requirements and frequently lend themselves to operability with a narrow or specific range of devices such as, for example, thermocouples, proximity sensors, etc. Adding to this problem is the fact that such input devices having specific operating characteristics are frequently expensive and hence the use of isolation input schemes are frequently simply not used because of their expense. This of course places the associated equipment at peril with the result that failures that due occur have a tendency to be catastrophic in nature.

More particularly, one of the problems with the mentioned input requirements is that an IEC1131 input inherently means larger than normal input currents, typically on the order of 4 mA in the OFF state. This leads to a number of problems such as heat dissipation or off-state leakage currents from turning on an input coupler (such as an optocoupler).

Accordingly, it is desirable and an object of the present invention to produce an input device for a PLC which allows for the use or a low-cost optocoupler as an input device. It is also desirable and an object of the present invention to produce an input device for a PLC which allows for low or small voltage optocouplers.

Still a further object of the present invention is to produce an input device for a PLC which limits the current at full line voltage thereby resulting in acceptable heat dissipation levels.

Another object of the present invention is to produce an input device for a PLC which allows for the use of smaller and less expensive devices as well as allowing for a large number of circuits to fit into a relatively small package.

Yet another object of the present invention is to produce an input device for a PLC which prevents off-state leakage current from turning on the isolation circuit input optocoupler until a specific turn-on threshold is met.

Finally, it is yet another object of the present invention to produce an input device for use with an automation device having a field device connectable thereto, comprising an AC to DC power supply having a capacitive input impedance device therein for producing an output voltage at a lower voltage from an input voltage; a current source having an input connected to the output voltage for producing a constant predetermined maximum output current; a diagnostic optocoupler having a diagnostic Led contained therein connected to the current source such that the diagnostic Led does not turn on until the output current of the current source reaches a predetermined level thereby determining the presence of the external field device; and an input optocoupler circuit having an input Led therein connected to said diagnostic optocoupler and the current source such that current present at an input of the optocoupler which is in excess of said predetermined level of the current source flows through an input of the input optocoupler and thereby indicate that the external field device is active.

BRIEF DESCRIPTION OF THE DRAWINGS

Reference may be now had to the accompanying drawing in which.

DETAILED DESCRIPTION OF PREFERRED EMBODIMENT

CONSTRUCTION

Figure 1:
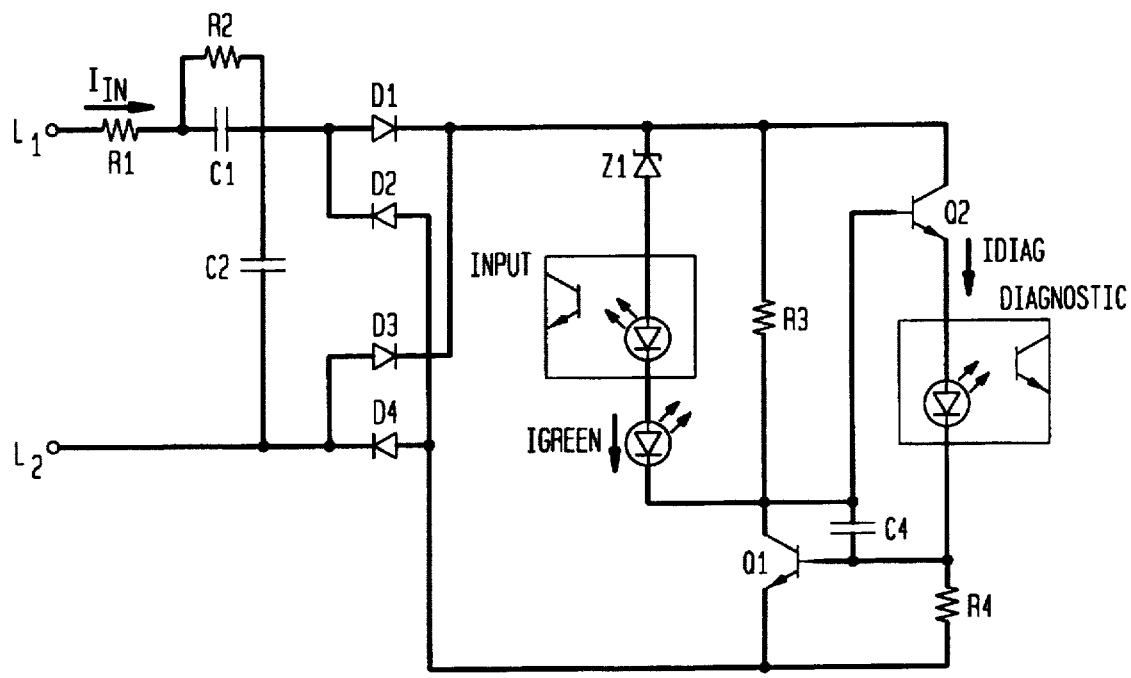
FIG. 1 is a schematic diagram of an PLC input device according to the present invention.

Referring now to FIG. 1 there is shown a schematic diagram of the input device according to the present invention. More particularly, Input terminal L1 is connected to one terminal of resistor R1. The remaining terminal of resistor R1 is connector to one terminal of resistor R2 and capacitor C1. The remaining terminal of resistor R2 is connected to the remaining terminal of capacitor C1, one terminal of capacitor C2 and to the anode and cathode of diodes D1 and D2 respectively.

The remaining terminal of capacitor C2 is connected to input line terminal L2 and to the anode and cathode of diodes D3 and D4 respectively. Diodes D1, D2, D3 and D4 are thereby connected across the terminals of capacitor C2 so as to form a full wave bridge rectifier circuit. Accordingly, the cathodes of diodes D1 and D3 are connected to each other thereby forming a rectified negative (−) output terminal, while the anodes of diodes D2 and D4 are connected to each other thereby forming a rectified positive (+) output terminal.

The tied together cathodes of diodes D1 and D3 (−) are connected to the cathode of zener diode Z1, one terminal of resistor R3 and the input (collector) terminal of transistor Q2. The remaining terminal of zener diode Z1 is connected to the light emitting diode (Led) anode terminal of an input optocoupler. The remaining terminal of the Led in the input optocoupler is connected to the anode of an Led (Igreen), although it is to be understood that other colors can and may be used without departing from the spirit and scope of the present invention. The remaining terminal of Igreen is connected to the remaining terminal of resistor R3 and to the collector of transistor Q1, one terminal of capacitor C4 and to the base of transistor Q2.

The emitter of transistor Q2 is connected to the anode of an Led in a diagnostic optocoupler. The remaining terminal of the Led in the diagnostic optocoupler is connected to the remaining terminal of capacitor C4, the base of transistor Q1 and to one terminal of resistor R4. The remaining terminal of resistor R4 is connected to the emitter of transistor Q1 and to the remaining terminals (+) of diodes D2 and D4.

OPERATION

Referring now to FIG. 1 the overall operation of the present invention will be described. More particularly, it can be seen that the input impedance across input terminals L1 and L2 consists of two resistors R1 and R2 as well as two capacitors C1 and C2 although resistor R1 and capacitor C1 are the actual impedance devices which drop most of the AC input line voltage. In the preferred embodiment of the present invention, this impedance is almost entirely capacitive in order to avoid heat dissipation. Resistor R2 is used to charge capacitor C1 when the input voltage is off. Capacitor C2 is used to filter high frequency noise and in the preferred embodiment of the present invention has no effect in the frequency range of preferred use in the present invention (60 Hz).

As can also be seen, the input voltage is full wave rectified by diodes D1-D4 in order to provide a suitable DC voltage. Transistors Q1 and Q2, resistors R4 and R3 form a current source. The current flowing in resistor R4 is determined by the Vbe of transistor Q2. In the preferred embodiment of the present invention, this current is approximately 6.6 mA. Capacitor C4 is used to prevent oscillation of the overall circuit.

Accordingly, as the voltage appears across line terminals L1 and L2, which in the preferred embodiment of the present invention is 120 VAC as may be found with use of a field device such as, for example, a proximity switch, current will begin to flow in transistor Q2, resistor R4 and the diagnostic optocoupler Led. At the turn on voltage, which is in the preferred embodiment of the present invention is approximately 3 volts, there is enough current in the diagnostic optocoupler to turn on the isolated output thereof which in turn is used as a diagnostic bit, thereby indicating the presence of a field device (not shown) such as a proximity switch or the like. This is sometimes referred to as a broken wire sensor since field devices exhibit leakage current and therefore the absence of leakage current through the logic side of the diagnostic optocoupler, as presented to the PLC would indicate that the field device is not working properly. The current Idiag will continue to increase with the increasing voltage until a predetermined set point is reached. At that point the current through Q2 will not increase any more.

Further, once this set point is reached, the current in resistor R3 increases. As the R3 resistor voltage reaches the threshold point set by zener diode Z1, the current will flow through the input optocoupler Led and the green Led, which in the preferred embodiment of the present invention is approximately 42 VAC. It is to be understood that other input voltages and threshold levels may be utilized without departing from the spirit and scope of the present invention.

The diagnostic optocoupler, as can be seen, transfers the signal to the logic circuits. Depending upon choice of component values in the overall circuit of FIG. 1, the output of the diagnostic optocoupler may be filtered since it may produce a square wave at a multiple of the input line frequency. Further, the diagnostic optocoupler Led is contained in the mentioned current source such that the Led forward current (Idiag) current becomes constant once the mentioned set point is reached thereby also helping to limit power dissipation in the circuit.

Electrically parallel to resistor R3 are three diodes, Z1, the green Led and the Led of the input optocoupler. Zener diode Z1 is chosen such that it sets the threshold at which current Z1 will flow through into input optocoupler led and the green status Led. Accordingly, the green Led effectively indicates the energization of the field device such as a proximity switch, while the logic side of the input optocoupler transfers the state of the field device (which in the case of a proximity switch is the presence or absence of a particular item) via the input channel of the present invention (ON or OFF) to its logic side, which is connected to an I/O port on the PLC, while maintaining electrical isolation. Due to the circuit configuration, current does not begin to flow in the input optocoupler Led until the set point of the mentioned current source is reached, thereby preventing large leakage currents from turning the input on and providing a false logic signal. Thereafter, once the set point is reached, the current through the input optocoupler Led is proportional to the input line voltage.

It is to be understood that may variations of the present invention may be practiced without departing from the spirit and scope of the present invention and the scope of protection is to be limited by the claims appended hereto.

What is claimed is:

1. An input isolation device for use with an automation device having a external field device connectable thereto, comprising:

an AC to DC power supply having a capacitive input impedance device therein for producing an output voltage at a lower voltage from an input voltage;

a current source having an input connected to said output voltage for producing a constant predetermined maximum output current;

a diagnostic optocoupler having a diagnostic Led contained therein connected to said current source such that said diagnostic Led does not turn on until the output current of said current source reaches a predetermined level thereby determining the presence of the external field device; and an input optocoupler circuit having an input Led therein connected to said diagnostic optocoupler and said current source such that current present at an input of said input optocoupler which is in excess of said predetermined level of said current source flows through an input of said input optocoupler and thereby indicate that the external field device is active.

2. A device according to claim 1 wherein said capacitive input impedance is comprised of at least a first capacitor in series with said input of said power supply and further having a first resistor in parallel with said first capacitor and further having a second capacitor across said input voltage.

3. A device according to claim 2 further comprising a second resistor in series with said first capacitor.

4. A device according to claim 2 further comprising a full wave bridge rectifier connected in parallel with said second capacitor.

5. A device according to claim 1 wherein said current source is comprised of a third resistor in series with the collector of a first transistor and wherein said third resistor is connected in parallel with the collector and base terminals of a second transistor and further comprising a fourth resistor connected in series with the base of said second transistor and in parallel with the base and emitter of said first transistor, said collector of said second transistor and said emitter of said first transistor connected to said output voltage of said power supply.

6. A device according to claim 5 wherein said input Led of said input optocoupler is connected in series with a zener diode thereby forming a series combination which is connected in parallel with said third resistor.

7. A device according to claim 5 wherein said Led of said diagnostic optocoupler is connected in series with said base of said second transistor.

8. A device according to claim 6 further comprising a third Led connected in series with said Led of said Input optocoupler, such that said third Led is energized when the output voltage of said power supply reaches a predetermined level.

9. An input isolation device for use with an automation device having a external field device connectable thereto, comprising:

an AC to DC power supply having a capacitive input impedance device therein for producing an output voltage at a lower voltage from an input voltage, said capacitive input impedance comprised of at least a first capacitor in series with said input of said power supply and further having a first resistor in parallel with said first capacitor and further having a second capacitor across said input voltage;

a current source having an input connected to said output voltage for producing a constant predetermined maximum output current, said current source comprised of a third resistor in series with the collector of a first transistor and wherein said third resistor is connected in parallel with the collector and base terminals of a second transistor and further comprising a fourth resistor connected in series with the base of said second transistor and in parallel with the base and emitter of said first transistor, said collector of said second transistor and said emitter of said first transistor connected to said output voltage of said power supply;

a diagnostic optocoupler having a diagnostic Led contained therein connected to said current source such that said diagnostic Led does not turn on until the output current of said current source reaches a predetermined level thereby determining the presence of the external field device;

an input optocoupler circuit having an input Led therein connected to said diagnostic optocoupler and said current source such that current present at an input of said input optocoupler which is in excess of said predetermined level of said current source flows through an input of said input optocoupler and thereby indicate that the external field device is active and wherein said Led of said diagnostic optocoupler is connected in series with said base of said second transistor;

further comprising a third Led connected in series with said Led of said Input optocoupler, such that said third Led is energized when the output voltage of said power supply reaches a predetermined level.

10. A device according to claim 9 further comprising a second resistor in series with said first capacitor.

11. A device according to claim 9 further comprising a full wave bridge rectifier connected in parallel with said second capacitor.

12. A device according to claim 5 wherein said input Led of said input optocoupler is connected in series with a zener diode thereby forming a series combination which is connected in parallel with said third resistor.

\* \* \* \* \*